(12) United States Patent
Kim et al.

(10) Patent No.: US 12,086,119 B2
(45) Date of Patent: Sep. 10, 2024

(54) DISCOVERING CONTEXTS AND STRUCTURED DATA STRUCTURES FROM HAZY DATA

(71) Applicant: The Boeing Company, Chicago, IL (US)

(72) Inventors: Hyun Joo Kim, Irmo, SC (US); Richard Montoney, Charleston, SC (US)

(73) Assignee: THE BOEING COMPANY, Arlington, VA (US)

( * ) Notice: Subject to any disclaimer, the term of this patent is extended or adjusted under 35 U.S.C. 154(b) by 35 days.

(21) Appl. No.: 17/653,530

(22) Filed: Mar. 4, 2022

(65) Prior Publication Data

US 2023/0281178 A1 Sep. 7, 2023

(51) Int. Cl.
G06F 16/20 (2019.01)
G06F 16/22 (2019.01)
G06F 16/81 (2019.01)
G06F 16/835 (2019.01)

(52) U.S. Cl.
CPC .......... *G06F 16/2228* (2019.01); *G06F 16/81* (2019.01); *G06F 16/8358* (2019.01)

(58) Field of Classification Search
CPC ... G06F 16/2228; G06F 16/8358; G06F 16/81
USPC ...................................................... 707/744
See application file for complete search history.

(56) References Cited

U.S. PATENT DOCUMENTS

| | | | | |
|---|---|---|---|---|
| 6,092,120 A | * | 7/2000 | Swaminathan | G06F 9/445 709/236 |
| 9,251,232 B2 | | 2/2016 | Carvalho | |
| 2008/0098373 A1 | * | 4/2008 | Vishwanath | G06F 40/149 715/234 |
| 2012/0136884 A1 | * | 5/2012 | Kanawa | G06F 16/8358 707/E17.07 |
| 2014/0067762 A1 | * | 3/2014 | Carvalho | G06F 16/22 707/636 |

(Continued)

OTHER PUBLICATIONS

MongoDB, "Data Modeling Introduction—MongoDB Manual" URL: https://docs.mongodb.com/manual/data-modeling/, retrieved on Mar. 4, 2022, 13 pages.

(Continued)

*Primary Examiner* — Vincent F Boccio
(74) *Attorney, Agent, or Firm* — MH2 Technology Law Group LLP (57) ABSTRACT

A method for storing data of an unknown data context and structure in a structured storage system is described. The method includes extracting a list of key-value pairs from one or more inbound data blocks from one or more external data sources; calculating similarities for the list of key-value pairs from the one or more inbound data blocks based on one or more current existing data structures; determining a highest similarity from the similarities for the list among the one or more current existing data structures; determining that the highest similarity for the list does not meet a predetermined similarity threshold; creating a new data structure to store the list of key-value pairs for a first inbound data block from the one or more inbound data blocks; and storing the list of key-value pairs in the new data structure in the structured storage system.

20 Claims, 6 Drawing Sheets

(56) References Cited

U.S. PATENT DOCUMENTS

2017/0185573 A1* 6/2017 Milvaney ............ H04L 67/1097
2019/0171503 A1* 6/2019 Schaude ................. G06F 9/547

OTHER PUBLICATIONS

Wikipedia, "XML database," URL: https://en.wikipedia.org/wiki/XML_database, retrieved on Mar. 4, 2022, 3 pages.

Automatic Schema Generation, URL: https://docs.oracle.com/cd/E19501-01/819-3659/6n5s6m5da/index.html, retrieved on Mar. 4, 2022, 5 pages.

Extended European Search Report issued in corresponding EP Application No. 23158024.2, 12 pages.

* cited by examiner

DISCOVERING CONTEXTS AND STRUCTURED DATA STRUCTURES FROM HAZY DATA

FIELD

This subject matter disclosed herein relates generally to databases, and more particularly, to discovering contexts and structured data structures from hazy data.

BACKGROUND

Data is often transferred in and out between organizations to cooperate business, or public data from external sources such as social media is utilized within an organization to analyze trends and sentiments on products. The data structures, such as data schemas, in external data sources are unknown and data needs to be persisted to in-house structured storages for further use.

When data streamed in from external sources is received, their data schemas are often not known. The simplest way to store them is as flat files, however, files are not easy to query, operate, and analyze. Also, each file can have different format since data come from various external sources (for example, different organizations), and have various data context (for example, work order, material, user, etc.). There is a need to create a data structure for incoming data from various sources by discovering data context and structure.

SUMMARY

According to examples of the present disclosure, a method for storing data of an unknown data context and structure in a structured storage system is disclosed. The method comprises extracting a list of key-value pairs from one or more inbound data blocks from one or more external data sources; calculating similarities for the list of key-value pairs from the one or more inbound data blocks based on one or more current existing data structures; determining a highest similarity from the similarities for the list among the one or more current existing data structures; determining that the highest similarity for the list does not meet a predetermined similarity threshold; creating a new data structure to store the list of key-value pairs for a first inbound data block from the one or more inbound data blocks; and storing the list of key-value pairs in the new data structure in the structured storage system.

According to examples of the present disclosure, a computer system is disclosed that comprises a hardware processor and a non-transitory storage medium that stores instructions, that when executed by the hardware processor, performs a method for storing data of an unknown data context and structure in a structured storage system. The method comprises extracting a list of key-value pairs from one or more inbound data blocks from one or more external data sources; calculating similarities for the list of key-value pairs from the one or more inbound data blocks based on one or more current existing data structures; determining a highest similarity from the similarities for the list among the one or more current existing data structures; determining that the highest similarity for the list does not meet a predetermined similarity threshold; creating a new data structure to store the list of key-value pairs for a first inbound data block from the one or more inbound data blocks; and storing the list of key-value pairs in the new data structure in the structured storage system.

Various additional features can be included in the computer system and the method for storing data of an unknown data context and structure in a structured storage system including one or more of the following features. Each of the one or more external data sources have different data structures for their respective data sets. The highest similarity is lower than the predetermined similarity threshold. The creating a new data structure comprises generating and executing a data command to create a database object in the structured storage system. The data command is a Data Definition Language (DDL) command. The storing comprises executing a data command to insert the list of key-value pairs into the structured storage system. The data command is a Data Manipulation Language Command (DML). The method further comprises generating metadata from the one or more inbound data blocks. The method further comprises storing the metadata in the new data structure with an associated key-value pair. The metadata comprises a time value associated with one of the one or more inbound data blocks, a data source associated with the one of the one or more inbound data blocks, or both. The method further comprises consolidating the new data structure with another data structure that meet the predetermined similarity threshold.

According to examples of the present disclosure, a method for storing data of an unknown data context and structure in a structured storage system is disclosed. The method comprises extracting a list of key-value pairs from one or more inbound data blocks from one or more external data sources; calculating similarities for the list of key-value pairs from the one or more inbound data blocks based on one or more current existing data structure; determining a highest similarity from the similarities for the list among the one or more current existing data structures; determining that the similarity for the list does meet a predetermined similarity threshold; integrating the list into a first current existing data structure of the one or more current existing structures; and storing the list of key-value pairs in the first current existing data structure in the structured storage system.

According to examples of the present disclosure, a computer system is disclosed that comprises a hardware processor and a non-transitory storage medium that stores instructions, that when executed by the hardware processor, performs a method for storing data of an unknown data context and structure in a structured storage system is disclosed. The method comprises extracting a list of key-value pairs from one or more inbound data blocks from one or more external data sources; calculating similarities for the list of key-value pairs from the one or more inbound data blocks based on one or more current existing data structure; determining a highest similarity from the similarities for the list among the one or more current existing data structures; determining that the similarity for the list does meet a predetermined similarity threshold; integrating the list into a first current existing data structure of the one or more current existing structures; and storing the list of key-value pairs in the first current existing data structure in the structured storage system.

Various additional features can be included in the computer system and the method for storing data of an unknown data context and structure in a structured storage system including one or more of the following features. Each of the one or more external data sources have different data structures for their respective data sets. The highest similarity is greater than the predetermined similarity threshold. The integrating comprises generating and executing a data command to modify a database object in the structured storage system. The data command is a Data Definition Language (DDL) command. The method further comprises generating metadata from the one or more inbound data blocks. The method further comprising storing the metadata in the first current existing data structure with an associated key-value pair. The method further comprising consolidating the first current existing data structure with another data structure that meet a predetermined similarity threshold. The storing comprises executing a data command to insert the list of key-value pairs into the structured storage system. The data command is a Data Manipulation Language Command (DML).

According to examples of the present disclosure, a method for storing data of an unknown data context and structure in a structured storage system is disclosed. The method comprises extracting a list of key-value pairs from one or more inbound data blocks from one or more external data sources; determining that a data structure does not exist; creating a new data structure to store the list of key-value pairs for a first inbound data block from the one or more inbound data blocks; and storing the list of key-value pairs in the new data structure in the structured storage system.

According to examples of the present disclosure, a computer system is disclosed that comprises a hardware processor and a non-transitory storage medium that stores instructions, that when executed by the hardware processor, performs a method for storing data of an unknown data context and structure in a structured storage system is disclosed. The method comprises extracting a list of key-value pairs from one or more inbound data blocks from one or more external data sources; determining that a data structure does not exist; creating a new data structure to store the list of key-value pairs for a first inbound data block from the one or more inbound data blocks; and storing the list of key-value pairs in the new data structure in the structured storage system.

Various additional features can be included in computer system and the method for storing data of an unknown data context and structure in a structured storage system including one or more of the following features. In some examples, each of the one or more external data sources may have different data structures for their respective data sets. The creating a new data structure comprises generating and executing a data command to create a database object in the structured storage system. The data command is a Data Definition Language (DDL) command. The storing comprises executing a data command to insert the list of key-value pairs into the structured storage system. The data command is a Data Manipulation Language Command (DML). The method further comprises generating metadata from the one or more inbound data blocks. The method further comprises storing the metadata in the new data structure with an associated key-value pair. The metadata comprises a time value associated with one of the one or more inbound data blocks, a data source associated with the one of the one or more inbound data blocks, or both.

Advantages of the examples will be set forth in part in the description which follows, and in part will be understood from the description, or may be learned by practice of the example. The advantages will be realized and attained by means of the elements and combinations particularly pointed out in the appended claims.

It is to be understood that both the foregoing general description and the following detailed description are exemplary and explanatory only and are not restrictive of the example(s), as claimed.

The accompanying drawings, which are incorporated in and constitute a part of this specification, illustrate examples and together with the description, serve to explain the principles of the example.

DETAILED DESCRIPTION

Reference will now be made in detail to the present examples, which are illustrated in the accompanying drawings. Wherever possible, the same reference numbers will be used throughout the drawings to refer to the same or like parts.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

The following examples are described for illustrative purposes only with reference to the Figures. Those of skill in the art will appreciate that the following description is exemplary in nature, and that various modifications to the parameters set forth herein could be made without departing from the scope of the present example. It is intended that the specification and examples be considered as examples only. The various examples are not necessarily mutually exclusive, as some examples can be combined with one or more other examples to form new embodiments.

Generally speaking, most of external data sources, such as interactive social media applications where information is digitally shared for examples, news, photos, posts, etc., provide their data with application programming interfaces (APIs), but usually do not expose their data model. For example, third party business partners and/or collaborators may send requests and responses as structured data (XML or X12) and its format is known in advance, but there can be many variations to use the format to cover different types of data. When inbound data is stored from external data sources where their data model is unknown, the inbound data is often stored as it is, such as stored in an unstructured format. For example, the entire data is stored as a string in a storage system such as SQL or NoSQL, as an example of a simplest model without elaborated data modeling, or stored in a file system as a text file. However, in the case where a SQL database is the major storage system in use and a model is needed for the external data to fit into the SQL database so as to cooperate with existing SQL data storage, an approach is needed to map external data to SQL data structures, such as tables and their respective columns of the table.

Even from a single external data source, each data stream may have different values. Consider, for instance, short messages or posts from a social media application as incoming data blocks from a data source. For example, post 1 may have key-value pair 1, namely <user id, date, content>, post2 may have key-value pair 2, namely <user id, date, content, location>, and post3 may have key-value pair 3, namely <user id, date, content, favorite, hashtag, reply>. The key-value pairs can have common fields, but also different fields. Therefore, a data structure may evolve as more data is processed. Examples of the present disclosure provides for data modeling to define data structure, such as data schemas, for external data when their data model is unknown, but structured, adjust data structures dynamically over incoming data stream, and store data into the defined SQL structures.

The disclosed examples provide for increased computational efficiency and make data retrieval, modeling, and analysis efficient as the text type of data input is stored to a structured storage. According to one example, a method is disclosed that discovers data context of incoming data (regardless of data sources), categorize mixed context of data to relevant data structures, generate data structures to persist data into structured storages, and adapt data structures until complete data structures of data sources are discovered. The method automatically generates structured data structures for incoming data on-the-fly by creating a data context and structure, so the data can be stored in a structured storage system. The disclosed examples do not need knowledge of the input data structure from the external data sources and data structure is not limited to a particular format. A list of key-value pairs is extracted from the input data. Different sources of data may have its own structured data set. The data structure can include one or more tables to be stored in a structured database. The disclosed examples provide methods to reduce the number of tables by similarity calculations as shown by equation 1. For example, if a new data input is found to have a new key that does not exist in any tables as a column, it can be stored in a new table. All keys including the new key for the new data input are created as column in the new table. However, if there exists a table that has similar data structure as determined by the similarity calculation, as shown in equation 1, to accommodate the new data input, the existing table is expanded by adding additional columns to include the new keys.

Further, the disclosed examples operate based on flexible schema, by varying sets of key-value pairs for a single data context from a single data source, and also varying sets of key-value pairs for the same data context but from different data sources. If each data source has its own data structure and key names even though data context is the same, separate tables are created to accommodate data from different data sources. If different data sources have the same data structure and use the same key names, for example, in case they share the same data structure but send data from different locations or from different computer devices, then the data from multiple data sources can be consolidated in a single table.

Data context is discovered by comparing the list of key-value pairs extracted from a data input with existing data structures. An existing data structure that has more keys for the data input has closer data context to the data input. The data structure can be modified to accommodate the data input by adding new keys into its structure (e.g., adding new keys as columns in the table), therefore, the data structure can evolve and be elaborated for the data context. Similarities (and/or degree of similarity) are calculated per data input over one or more existing data structure. The similarity is defined as how a set of key-value pairs for a data input is similar to a particular data structure, and is used to determine the most similar data structure where the input data will be consolidated. It is calculated for each existing data structure and formulated as below.

$$\text{Similarity (input, data structure)} = \frac{\text{count}\left(\text{Input}_{keys} \cap \text{DataStructure\_columns}\right)}{\min(\text{count (Input\_keys), count (DataStructure\_columns)})}. \quad (1)$$

A data structure is generated and stored in a structured database. Based on similarity, a selected data structure that has the highest similarity with the data input can be modified to accommodate new keys from a data input if there are, and values are stored in the data structure. If the similarity between the data input and the selected data structure does not meet the predetermined similarity threshold, a new data structure is created to accommodate the data input. The similarity threshold is a definable value between 0% and 100%, and can be generally set to 50%. If the similarity threshold is 0%, a data input is consolidated to a data structure even if any key in the data input exists in the data structure. If the similarity threshold is 100%, a data input is consolidated to a data structure where all keys in the data input exist. Also, a data structure can be consolidated to another data structure if the similarity between two data structures meet the predetermined similarity threshold. Consolidation of existing data structures is optional and it may be done periodically. Consolidation can be run to reduce the number of data structures and elaborate data structures with mature data context. Data structures generally are not consolidated if their similarity does not meet the predetermined similarity threshold. Where there is greater than or equal to 50% similarity, consolidation of the data structure can be done with more confidence.

According to the disclosed examples, inbound data can be loaded from one or more external data sources to a structured storage system without knowing their data structures or schema. Data context is discovered by calculating similarities over the set of key-pairs (or data structures), a data structure is generated per data context and data sources, and data structures can be adapted automatically as more data inputs are received and processed by consolidating new keys, or consolidating similar data structures.

Example Use Cases:

Data Source 1 --------------------→ Database A
Data Source 2 --------------------→ Database B Data from a first data source, such as Data Source 1 above, and a second data source, such as Data Source 2, where Data Source 1 and Data Source 2 are different sources and may have different data structures for transmitted data, is received, analyzed, and stored in a structured database. The structured database owner may use legacy systems and SQL databases as a dominant storage system, but receives and processes various data messages from multiple senders across organizations and may need to dump various context of data to structured storage system, or may need to categorize significant amount of data with mixed contexts to structured forms per context. Similarities of the inbound data are calculated for each data structure and the data structure which has the highest similarity is selected as the best match. If the similarity for the selected data structure is greater than the predetermined similarity threshold, the input data is consolidate to the selected data structure, otherwise, a new data structure is created.

For example, $\text{input}_{keys}$={K1, K2, K3}, $\text{DataStructure}_{cols}$={K1, K2, K5, K6, K7}, then the similarity (Input, DataStructure)=2/3=0.67 (or 67%).

Figure 1:
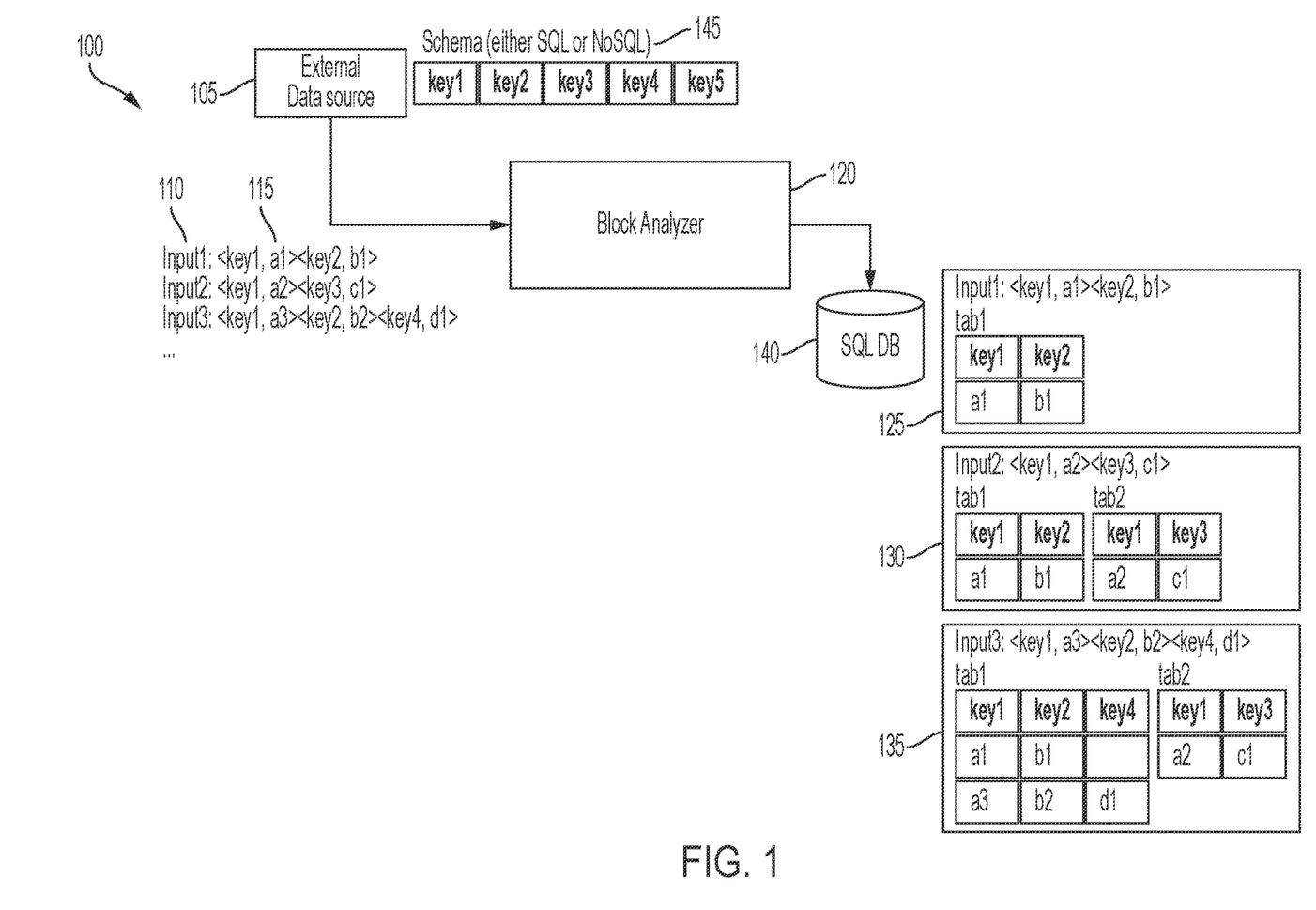
FIG. 1 shows a block diagram architecture for storing data of an unknown data context and structure in a structured storage system according to examples of the present disclosure.

FIG. 1 shows a block diagram architecture 100 for storing data of an unknown data context and structure in a structured storage system according to examples of the present disclosure. Architecture 100 comprises external data source 105 that produces and provides one or more data blocks 110. One or more data blocks 110 are streamed into data block analyzer, or block analyzer 120 that extracts list of key-value pairs 115 from one or more data blocks 110. A key-value pair comprises two related data elements, which include a key that is a constant that defines the data set and a value that is a variable that belongs to the set. In the example shown in FIG. 1, list of key-value pairs 115 are extracted from a first data block, a second data block, and a third data block from one or more data blocks 110 from external data source 105. The first data block includes two key-value pairs, namely <key1, a1> and <key2, b1>. The second data block includes two key-value pairs, namely <key1, a2> and <key3, c1>. The third data block includes three key-value pairs, namely <key1, a3>, <key2, b2>, and <key4, d1>. In this example, the items key1, key2, key 3, and key4 are the keys of the key-value pair and the items a1, a2, a3, b1, b2, c1, and d1 are the values of the key-value pair.

Block analyzer 120 calculates similarities for list of key-value pairs 115 from one or more inbound data blocks 110 based on one or more current existing data structures in database 140. Block analyzer 120 determines a highest similarity from the similarities for the list among the one or more current existing data structures. If the highest similarity is lower than the predetermined similarity threshold, the inbound data block is not consolidated to the data structure because the data context for the data structure is not similar enough to the data block. Instead, a new data structure is created for the data block. Or if there is not existing data structures in the database 140 to compare the similarity with the data block, then a new data structure is crated for the data block in database 140.

Continuing with the example shown in FIG. 1, when block analyzer 120 receives the first data block, a new data structure is created because there is no current existing data structure in the database 140. For example, table 1 is created with two columns associated to the keys for the first data block, namely key1 and key2. Then, the values for the key-value pair for the first data block, namely a1 and b1 are stored in the new data structure under their associated keys. For example, value a1 is stored in a table 1 under the column key1 and value b1 is stored in the table 1 under the column key 2, as shown in the snapshot of database 140 after processing a first data block 125. The key-value pairs for the second data block are compared with the existing data structure created for the first data block. For this example, a predetermined similarity threshold of 0.5 or 50% is assumed. Since the key-value pairs for the second data block do not meet the threshold for similarity of the existing data structure, the values for the key-value pair for the second data block, namely a2 and c1 are stored in a new data structure under their associated keys. For example, the similarity, as calculated using equation 1, between input 2 and the current table 1 shown in 125 is calculated as ½=0.5. Assuming the predetermined similarity threshold is 0.5 and a table which has a similarity greater than the threshold can be selected, table 1 does not meet the threshold to accommodate the second data block, therefore, a new data structure, table 2, is created with two columns associated to the keys for the second data block, and value a2 is stored in table 2 under the column key1 and value c1 is stored in table 2 under the column key 3, as shown in the snapshot of the database 140 after processing a second data block 130. The key-value pairs for the third data block are compared with current existing data structures, table 1 and table 2. Since the key-value pairs for the third data block do meet the threshold for similarity of table 1, the values for the key-value pairs for the third data block, namely a3 b2, and d1 are stored in table 1 under their associated keys with an additional column created to accommodate key4. For example, the similarity between input 3 and the current table 1 as shown in 130 is calculated as 2/2=1, and the similarity between input 3 and the current table 2 as shown in 130 is calculated as ½=0.5 by the similarity equation 1. Assuming a predetermined similarity threshold is 0.5 and a table which has a similarity greater than the threshold can be selected, table 1 has the highest similarity and meets the threshold, therefore, table 1 is selected to consolidate input 3. The key4 in input 3 is found as a new key because it does not exist in table 1. Therefore, table 1 is expanded to accommodate key4 by adding a new column, then value a3 is stored in table 1 under the column key1, value b2 is stored in table 1 under the column key2, and value d1 is stored in table 1 under the column key 4, as shown in the snapshot of database 140 after processing a third data block 135. The data structures, such as table 1 and table 2 are stored in database 140. The data structure for the first data block, the second data block, and the third data block comprises the following keys: key1, key2, key3, key4, and key5, as shown in the data structure for the external data source. The complete data structure 145 for data blocks from an external data source is unknown; however, as more data blocks are received and processed in block analyzer 120, data structures in database 140 are evolved and updated close to the complete data structure 145.

In some examples, block analyzer 120 can be co-located with database 140. In other examples, block analyzer 120 can be located in a separate location that is remote from database 140 and can communicate over a communications network. The functions performed by block analyzer 120 can be abstracted and performed as a software-as-a-service on a client device or by a cloud service provider.

Figure 2:
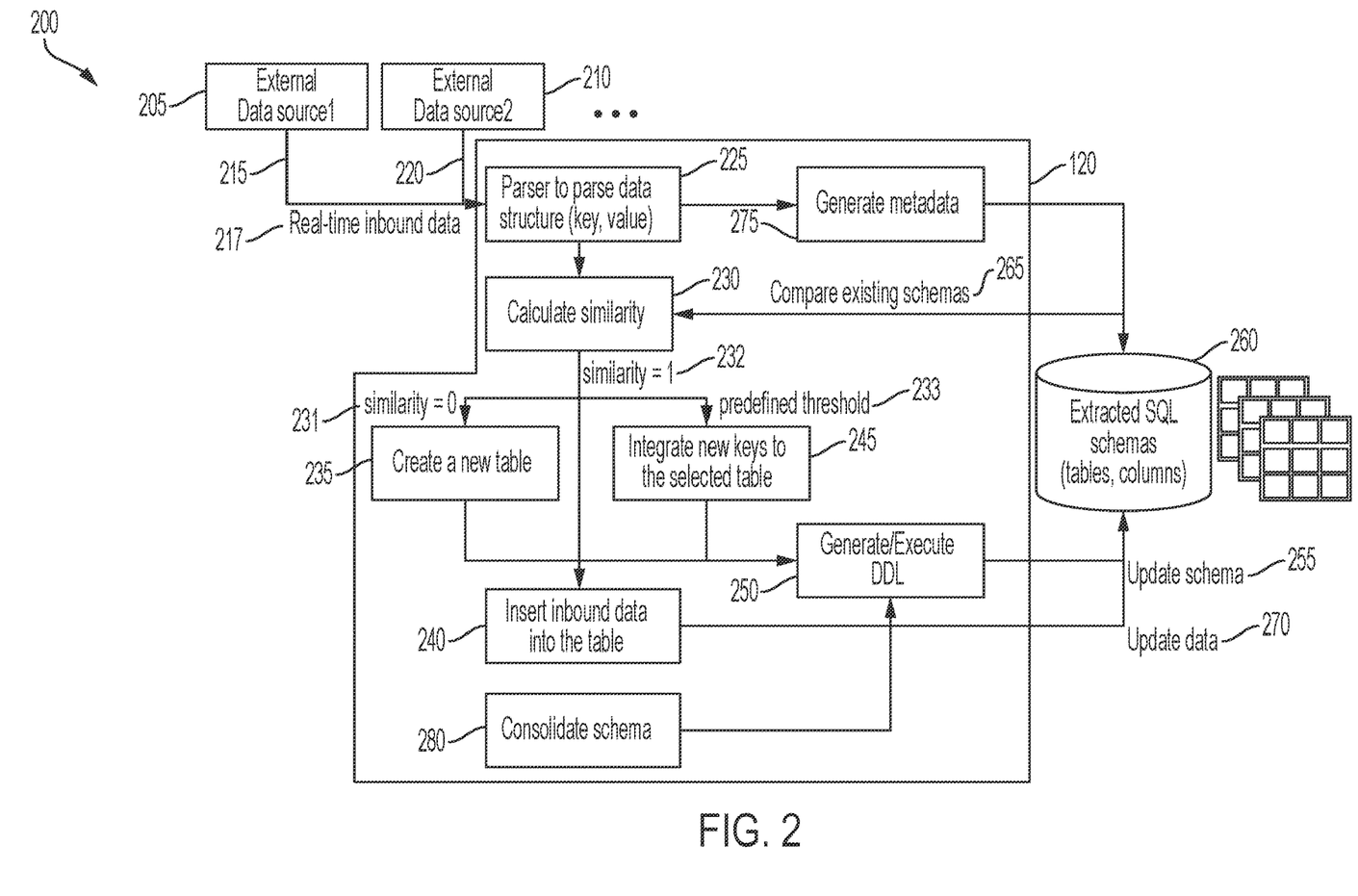
FIG. 2 shows a flow chart for a method for storing data of an unknown data context and structure in a structured storage system according to examples of the present disclosure.

FIG. 2 shows a flow chart for a method 200 for storing data of an unknown data context and structure in a structured storage system according to examples of the present disclosure. Method 200 comprises extracting a list of key-value pairs from one or more inbound data blocks. For example, the block analyzer 120 extracts the list of key-value pairs from the one or more inbound data blocks, such as real-time inbound data 217 in blocks 215 and 220, from one or more external data sources, such as external Data Source 1 205 and external Data Source 2 210, as in parser 225. In some examples, each of the one or more external data sources have different data structures for their respective data sets.

Method 200 continues by calculating similarities 230 for the list of key-value pairs from the one or more inbound data blocks based on one or more current existing data structures. For example, the block analyzer 120 calculates the similarities using similarity equation 1. A highest similarity from the similarities for the list among the one or more current existing data structures is then determined. If the similarity is calculated to be equal to zero 231, meaning that any data structure does not exist in database 260 yet or none of existing data structures have any of the same columns corresponding to the keys in the inbound data block, then a new data structure, such as a table, is created, as in 235. If the similarity is calculated to be equal to one 232 based on one or more current existing data structures, then the key-value pairs from the inbound data blocks 215 and 220 are consolidated into the data structure where the similarity is the highest, as in 240. If the similarity is calculated to be greater than a predetermined similarity threshold 233, such as greater than 0.5 or 50%, then the keys of the key-value pairs from the inbound data blocks 215 and 220 are consolidated into the data structure where the similarity is the highest, as in 245.

Method 200 continues by generating and executing a data command to create a database object in the structured storage system, as in 250, from blocks 235 and 245. For example, the block analyzer 120 generates and executes the data command to create the database object. The data command to create the database object is a Data Definition Language (DDL) command. Method 200 continues by updating the data structure by executing the generated DDL command by block analyzer 120, as in 255, from 250, that is stored in database 260. The similarity that is calculated in 230 is determined based on one or more current existing data structures stored in database 260, as in 265. Method 200 continues by updating data that is stored in database 260 by inserting key-value pairs for the data block into the selected data structure, as in 270, based on block 240. For example, one or more Data Manipulation Language (DML) commands are executed by the data block analyzer 125 to store key-value pairs to a data structure.

Method 200 further continues by generating metadata based on the real-time inbound data blocks 215, 220, as in 275, that is stored in database 260. For example, the block analyzer 120 generates the metadata. The metadata enables an association of a receiving data block to its stored data structure and makes data blocks traceable and auditable. The attributes of metadata can be generated from inbound data blocks or added with new values. For example, metadata can include timestamp of data receipt, sender information such as source URL, a unique identifier generated for each inbound data block, originally received data content, extracted key-value list, etc. The unique identifier can be carried with a key-value list and stored in a data structure, therefore data stored in the database 260 is traceable to its original data block. Method 200 can further comprise consolidating the data structure with another data structure that meets the predetermined similarity threshold, as in 280, that is then stored in database 260 by executing the data command by block analyzer 120 to create a database object in the structured storage system, such as the DDL command. For example, the block analyzer 120 performs the consolidating.

Figure 3:
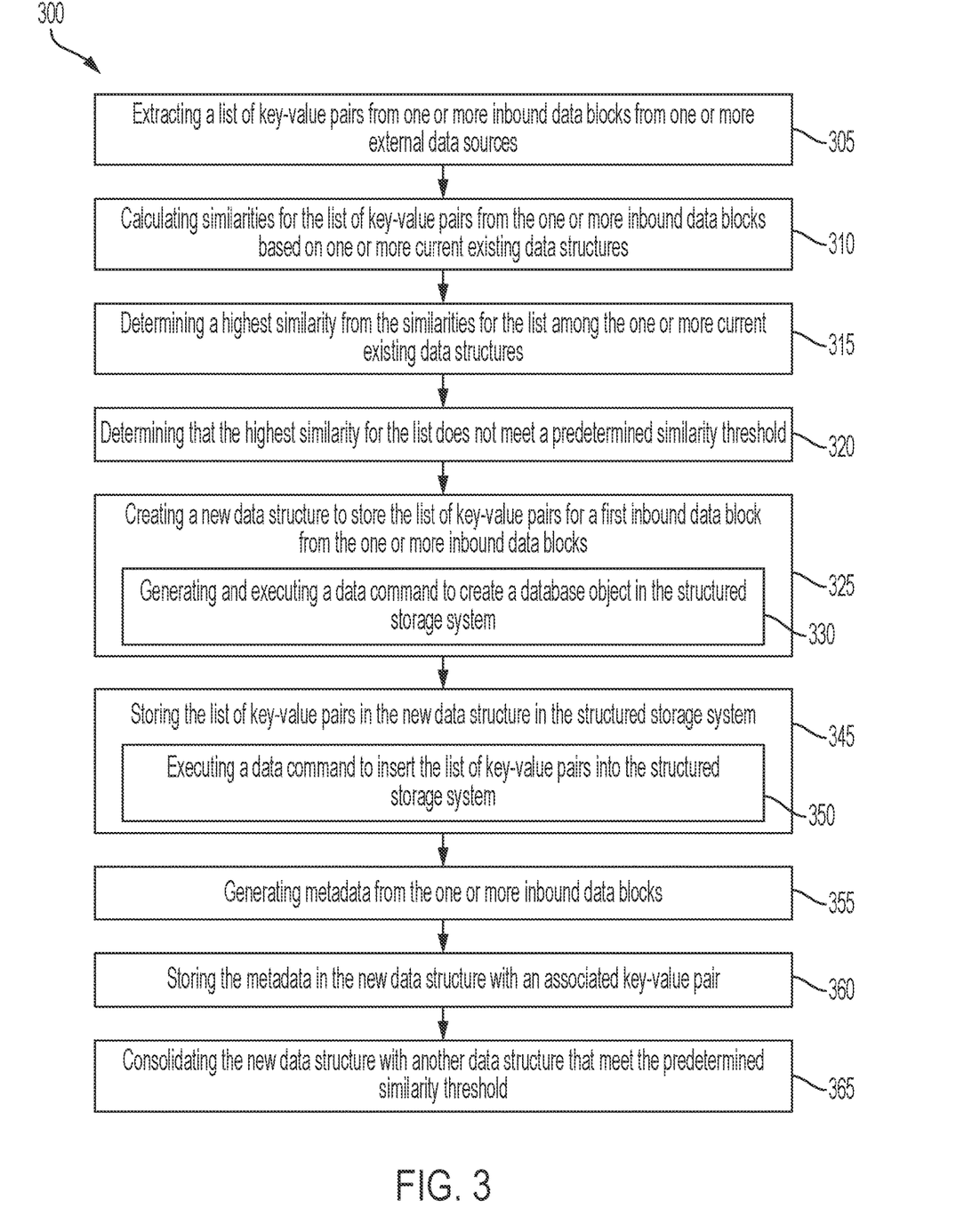
FIG. 3 shows a flowchart for a method for storing data of an unknown data context and structure in a structured storage system according to examples of the present disclosure.

FIG. 3 shows a flowchart for a method 300 for storing data of an unknown data context and structure in a structured storage system according to examples of the present disclosure. Method 300 comprises extracting a list of key-value pairs from one or more inbound data blocks from one or more external data sources, as in 305. For example, the block analyzer 120 extracts the list of key-value pairs from the one or more inbound data blocks. In some examples, each of the one or more external data sources have different data structures for their respective data sets.

Method 300 continues by calculating similarities for the list of key-value pairs from the one or more inbound data blocks based on one or more current existing data structures, as in 310. For example, the block analyzer 120 calculates the similarities using equation 1. Method 300 continues by determining a highest similarity from the similarities for the list among the one or more current existing data structures, as in 315. For example, the block analyzer 120 determines the highest similarity. The highest similarity is lower than the predetermined similarity threshold.

Method 300 continues by determining that the highest similarity for the list does not meet a predetermined similarity threshold, as in 320. For example, the block analyzer 120 determines that the highest similarity for the list does not meet a predetermined similarity threshold. Method 300 continues by creating a new data structure to store the list of key-value pairs for a first inbound data block from the one or more inbound data blocks, as in 325. For example, the block analyzer 120 creates the new data structure to store the list of key-value pairs. The creating a new data structure comprises generating and executing a data command to create a database table in the structured storage system, as in 330. The data command that is executed by the data analyzer 120 to create the database table is a Data Definition Language (DDL) command.

Method 300 continues by storing the list of key-value pairs in the new data structure in the structured storage system, as in 345. The storing comprises executing a data command to insert the list of key-value pairs into the structured storage system. The data command that is executed by the block analyzer 120 to insert the list of key-value pairs is a Data Manipulation Language Command (DML). For example, the block analyzer 120 executes the data command to insert the list of key-value pairs in the structured storage system, such as database 140, 260, as in 350.

Method 300 can further comprise generating metadata from the one or more inbound data blocks, as in 355. For example, the block analyzer 120 can generate the metadata. The metadata comprises a time value associated with one of the one or more inbound data blocks, a data source associated with the one of the one or more inbound data blocks, or both.

Method 300 can further comprise storing the metadata in the new data structure with an associated key-value pair, as in 360. For example, the block analyzer 120 executes a command to store the metadata in the structured storage system, such as database 140, 260. Method 300 can further comprise consolidating the new data structure with another data structure that meet the predetermined similarity threshold, as in 365. For example, the block analyzer 120 can execute a command to consolidate the new data structure with another data structure.

Figure 4:
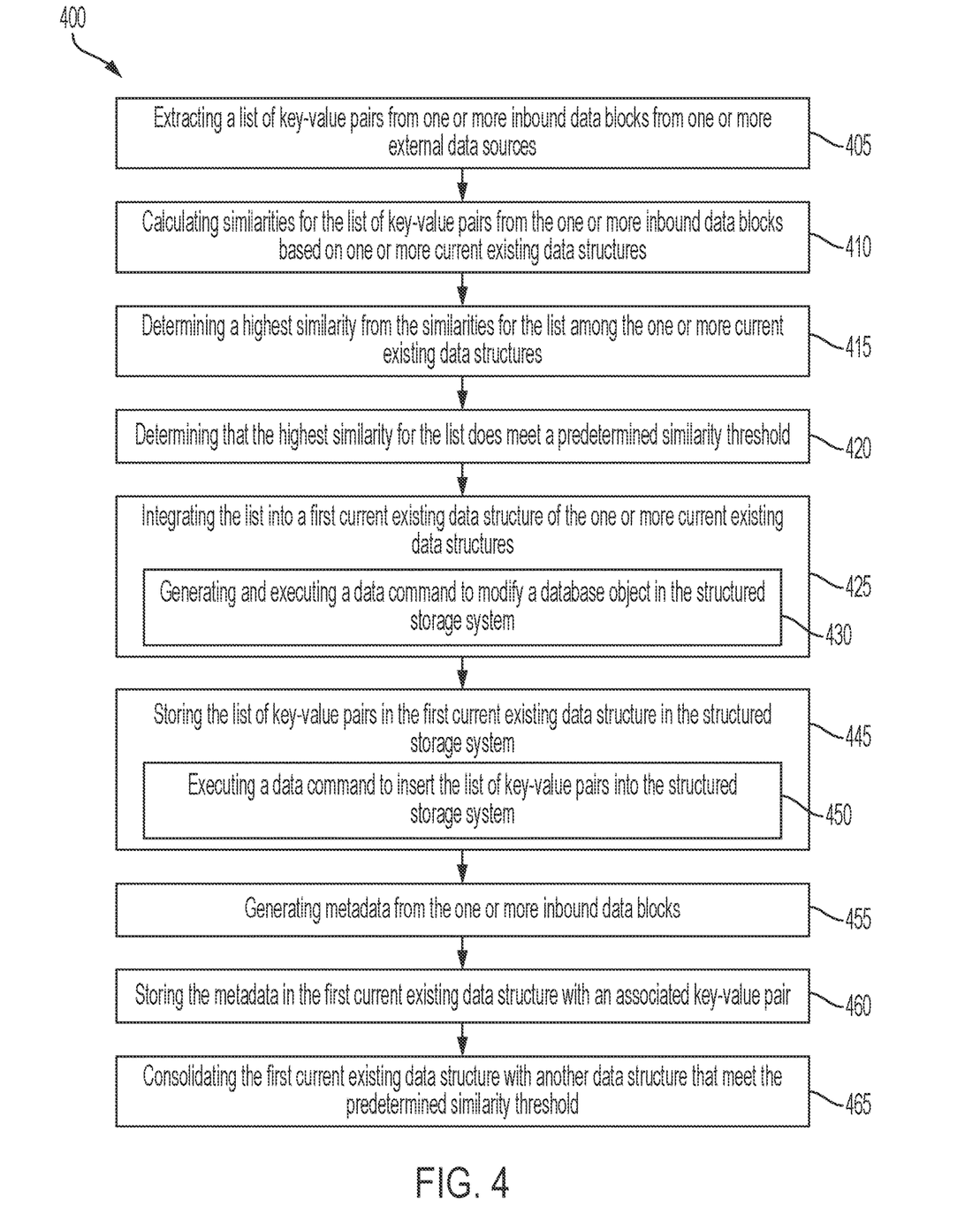
FIG. 4 shows a flowchart for a method for storing data of an unknown data context and structure in a structured storage system according to examples of the present disclosure.

FIG. 4 shows a flowchart for a method 400 for storing data of an unknown data context and structure in a structured storage system according to examples of the present disclosure. Method 400 for storing data of an unknown data context and structure in a structured storage system comprises extracting a list of key-value pairs from one or more inbound data blocks from one or more external data sources, as in 405. For example, the block analyzer 120 extracts the list of key-value pairs. Each of the one or more external data sources have different data structures for their respective data sets.

Method 400 continues by calculating similarities for the list of key-value pairs from the one or more inbound data blocks based on one or more current existing data structure, as in 410. For example, the block analyzer 120 calculates the similarities using equation 1. Method 400 continues by determining a highest similarity from the similarities for the list among the one or more current existing data structures, as in 415. For example, the block analyzer 120 determines the highest similarity.

Method 400 continues by determining that the highest similarity for the list does meet a predetermined similarity threshold, such as 50% as discussed above, as in 420. For example, block analyzer 120 makes a determination that the highest similarity for the list does meet a predetermined similarity threshold. The highest similarity is greater than the predetermined similarity threshold. Method 400 continues by integrating the list into a first current existing data structure of the one or more current existing data structures, as in 425. The integrating comprises generating and executing a data command to modify a database structure in the structured storage system. The data command that is executed by the data analyzer to modify the database structure is a Data Definition Language (DDL) command. For example, block analyzer 120 executes the data command to integrate the list into the first current existing data structure of the one or more current existing data structures.

Method 400 continues by storing the list of key-value pairs in the first current existing data structure in the structured storage system, such as database 140, 260, as in 430. For example, block analyzer 120 executes a data command to store the list of key-value pairs in the first current existing data structure in the structured storage system.

Method 400 can further comprise generating metadata from the one or more inbound data blocks, as in 435. For example, block analyzer 120 can generate the metadata. The metadata comprises a time value associated with one of the one or more inbound data blocks, a data source associated with the one of the one or more inbound data blocks, or both.

Method 400 can further comprise storing the metadata in the data structure where only metadata for data blocks are stored together, and a unique identifier for each metadata is stored along with key-value pairs extracted from its corresponding data block to a data structure in the structured data system, such as database 140, 260, as in 440. For example, block analyzer 120 can execute a data command to store the metadata in the structured storage system, such as database 140, 260. Method 400 can further comprise consolidating the first current existing data structure with another data structure that meets a predetermined similarity threshold, as in 445. For example, block analyzer 120 can consolidate the first current existing data structure with another data structure that meets a predetermined similarity threshold.

Figure 5:
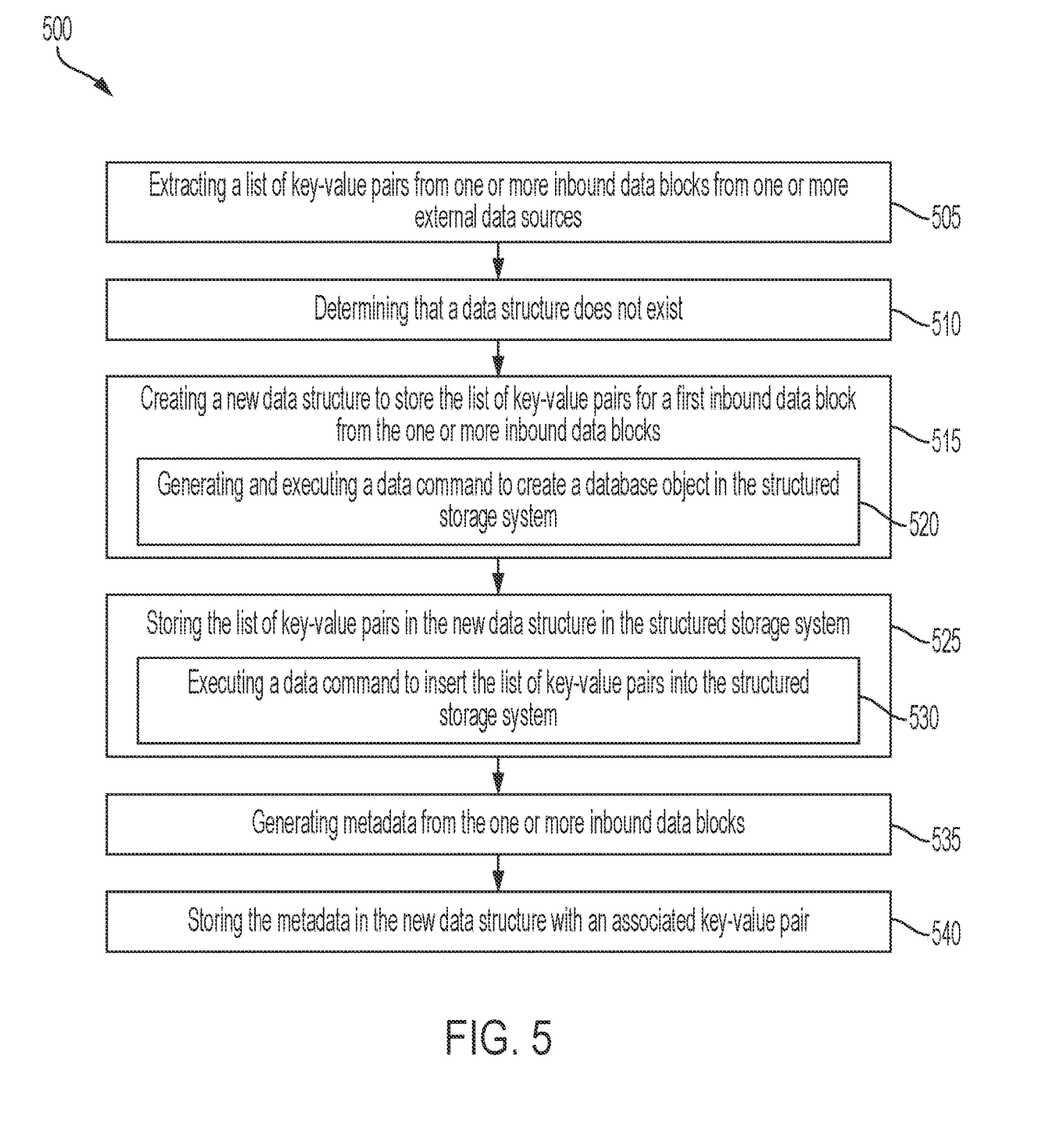
FIG. 5 shows a flowchart for a method for storing data of an unknown data context and structure in a structured storage system according to examples of the present disclosure.

FIG. 5 shows a flowchart for a method 500 for storing data of an unknown data context and structure in a structured storage system according to examples of the present disclosure. In this example, there are no existing data structures in the structured storage system, such as database 140, 260 for the incoming data stream to be stored. Method 500 for storing data of an unknown data context and structure in a structured storage system comprises extracting a list of key-value pairs from one or more inbound data blocks from one or more external data sources, as in 505. For example, block analyzer 120 can extract the list of key-value pairs. For example, at least one of the one or more external data sources may have different data structures for their respective data sets.

Method 500 continues by determining that a data structure does not exist, as in 510. For example, block analyzer 120 can determine that any data structure does not exist in the structured storage system, for example, when the method 500 is deployed for the first time, or the structured storage system is initialized. Method 500 continues by creating a new data structure to store the list of key-value pairs for a first inbound data block from the one or more inbound data blocks, as in 515. The creating a new data structure comprises generating and executing a data command to create a database structure in the structured storage system, such as database 140, 260, as in 520. The data command that is executed by block analyzer 120 to create the database structure is a Data Definition Language (DDL) command. For example, the data analyzer 120 can generate and execute the data command to create the database object.

Method 500 continues by storing the list of key-value pairs in the new data structure in the structured storage system, such as database 140, 260, as in 525. The storing comprises executing a data command to insert the list of key-value pairs into the structured storage system, as in 530. The data command that is executed by the block analyzer 120 to insert the list of key-value pairs into the structured storage system is a Data Manipulation Language Command (DML). For example, block analyzer 120 can generate and execute the data command to store the list of key-value pairs in the structured storage system.

Method 500 can further comprise generating metadata from the one or more inbound data blocks, as in 535. For example, block analyzer 120 can generate the metadata. The metadata comprises a time value associated with one of the one or more inbound data blocks, a data source associated with the one of the one or more inbound data blocks, or both.

Method 500 can further comprise storing the metadata in the new data structure with an associated key-value pair, as in 540. For example, block analyzer 120 can store the metadata in structured storage system in the new data structure with the associated key-value pair.

Figure 6:
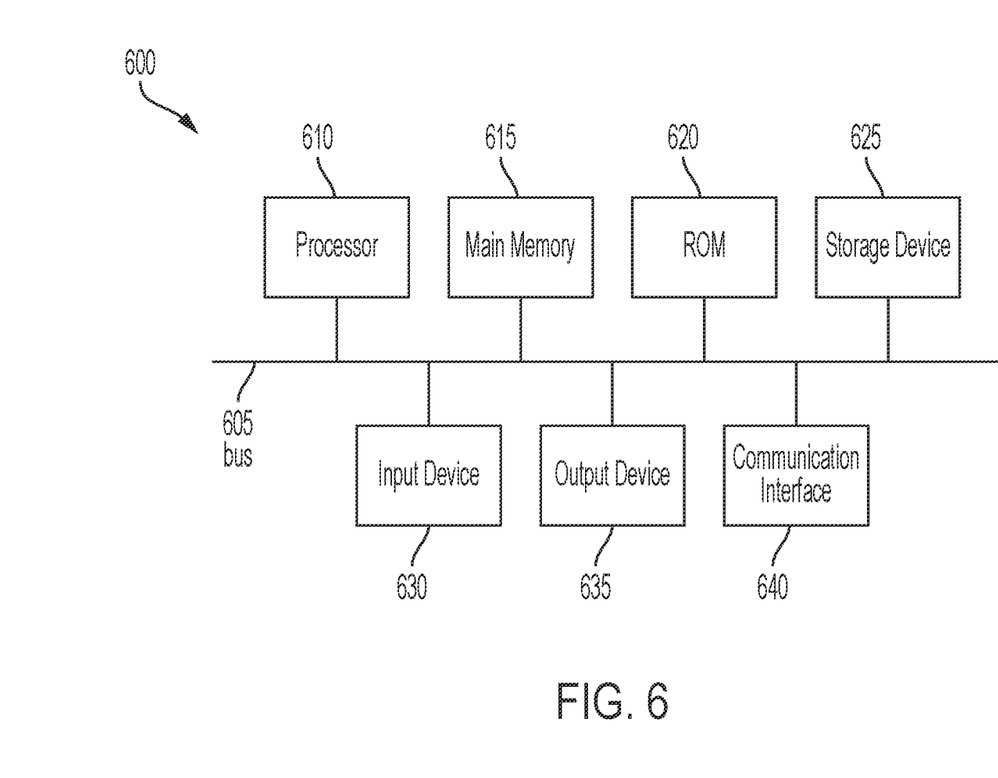
FIG. 6 illustrates example components of a device that may be used within environment, such as block analyzer, of FIG. 1 and comprises one or more components of device.

FIG. 6 illustrates example components of a device 600 that may be used within environment 100, such as block analyzer 120, of FIG. 1 and comprises one or more components of device 600.

As shown in FIG. 6, device 600 may include a bus 605, a processor 610, a main memory 615, a Read Only Memory (ROM) 620, a storage device 625, an input device 630, an output device 635, and a communication interface 640.

Bus 605 may include a path that permits communication among the components of device 600. Processor 610 may include a processor, a microprocessor, an application specific integrated circuit (ASIC), a field programmable gate array (FPGA), or another type of processor that interprets and executes instructions. Main memory 615 may include a Random Access Memory (RAM) or another type of dynamic storage device that stores information or instructions for execution by processor 610. ROM 620 may include a ROM device or another type of static storage device that stores static information or instructions for use by processor 610. Storage device 625 may include a magnetic storage medium, such as a hard disk drive, or a removable memory, such as a flash memory.

Input device 630 may include a component that permits an operator to input information to device 600, such as a control button, a keyboard, a keypad, or another type of input device. Output device 635 may include a component that outputs information to the operator, such as a Light Emitting Diode (LED), a display, or another type of output device. Communication interface 640 may include any transceiver-like component that enables device 600 to communicate with other devices or networks. In some implementations, communication interface 640 may include a wireless interface, a wired interface, or a combination of a wireless interface and a wired interface. In some examples, communication interface 640 may receive computer readable program instructions from a network and may forward the computer readable program instructions for storage in a computer readable storage medium (e.g., storage device 625).

Device 600 may perform certain operations, as described in detail below. Device 600 can perform these operations in response to processor 610 executing software instructions contained in a computer-readable medium, such as main memory 615. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions can be read into main memory 615 from another computer-readable medium, such as storage device 625, or from another device via communication interface 640. The software instructions contained in main memory 615 can direct processor 610 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 600 may include additional components, fewer components, different components, or differently arranged components than are shown in FIG. 6.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Examples of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In some examples, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In some examples, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, the disclosure comprises examples according to the following clauses:

Clause 1: A method for storing data of an unknown data context and structure in a structured storage system, the method comprising:
 extracting a list of key-value pairs from one or more inbound data blocks from one or more external data sources;
 calculating similarities for the list of key-value pairs from the one or more inbound data blocks based on one or more current existing data structures;
 determining a highest similarity from the similarities for the list among the one or more current existing data structures;
 determining that the highest similarity for the list does not meet a predetermined similarity threshold;
 creating a new data structure to store the list of key-value pairs for a first inbound data block from the one or more inbound data blocks; and
 storing the list of key-value pairs in the new data structure in the structured storage system.

Clause 2: The method of clause 1, wherein each of the one or more external data sources have different data structures for their respective data sets.

Clause 3: The method of any of clause 1 or clause 2, wherein the highest similarity is lower than the predetermined similarity threshold.

Clause 4: The method of any of clauses 1-3, wherein the creating a new data structure comprises generating and executing a data command to create a database object in the structured storage system.

Clause 5: The method of any of clauses 1-4, wherein the data command is a Data Definition Language (DDL) command.

Clause 6: The method of any of clauses 1-5, wherein the storing comprises executing a data command to insert the list of key-value pairs into the structured storage system.

Clause 7: The method of any of clauses 1-6, wherein the data command is a data manipulation language command (DML).

Clause 8: The method of any of clauses 1-7, further comprises generating metadata from the one or more inbound data blocks.

Clause 9: The method of any of clauses 1-8, further comprising storing the metadata in the new data structure with an associated key-value pair.

Clause 10: The method of any of clauses 1-9, wherein the metadata comprises a time value associated with one of the one or more inbound data blocks, a data source associated with the one of the one or more inbound data blocks, or both.

Clause 11: The method of any of clauses 1-10, further comprising consolidating the new data structure with another data structure that meet the predetermined similarity threshold.

Clause 12: A method for storing data of an unknown data context and structure in a structured storage system, the method comprising:
 extracting a list of key-value pairs from one or more inbound data blocks from one or more external data sources;
 calculating similarities for the list of key-value pairs from the one or more inbound data blocks based on one or more current existing data structure;
 determining a highest similarity from the similarities for the list among the one or more current existing data structures;
 determining that the highest similarity for the list does meet a predetermined similarity threshold;
 integrating the list into a first current existing data structure of the one or more current existing data structures; and
 storing the list of key-value pairs in the first current existing data structure in the structured storage system.

Clause 13: The method of clause 12, wherein each of the one or more external data sources have different data structures for their respective data sets.

Clause 14: The method of clause 12 or clause 13, wherein the highest similarity is greater than the predetermined similarity threshold.

Clause 15: The method of any of clauses 12-14, wherein the integrating comprises generating and executing a data command to modify a database object in the structured storage system.

Clause 16: The method of any clauses 12-15, wherein the data command is a Data Definition Language (DDL) command.

Clause 17: The method of any of clauses 12-16, further comprises generating metadata from the one or more inbound data blocks.

Clause 18: The method of any of clauses 12-17, further comprising storing the metadata in the first current existing data structure with an associated key-value pair.

Clause 19: The method of any of clauses 12-18, further comprising consolidating the first current existing data structure with another data structure that meet a predetermined similarity threshold.

Clause 20: A method for storing data of an unknown data context and structure in a structured storage system, the method comprising:
- extracting a list of key-value pairs from one or more inbound data blocks from one or more external data sources;
- determining that a data structure does not exist;
- creating a new data structure to store the list of key-value pairs for a first inbound data block from the one or more inbound data blocks; and
- storing the list of key-value pairs in the new data structure in the structured storage system.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

Notwithstanding that the numerical ranges and parameters setting forth the broad scope of the example are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the example has been illustrated respect to one or more implementations, alterations and/or modifications can be made to the illustrated examples without departing from the spirit and scope of the appended claims. In addition, while a particular feature of the example may have been disclosed with respect to only one of several implementations, such feature may be combined with one or more other features of the other implementations as may be desired and advantageous for any given or particular function.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other examples will be apparent to those skilled in the art from consideration of the specification and practice of the example disclosed herein. It is intended that the specification and examples be considered as exemplary only, with a true scope and spirit of the example being indicated by the following claims.

Other examples will be apparent to those skilled in the art from consideration of the specification and practice of the example disclosed herein. It is intended that the specification and examples be considered as exemplary only, with a true scope and spirit of the example being indicated by the following claims.

What is claimed is:

1. A method for storing data of an unknown data context and structure in a structured storage system, the method comprising:
- extracting, by a hardware processor and in real time, a list of key-value pairs from one or more inbound data blocks from one or more external data sources, wherein each key-value pair in the list of key-value pairs comprises a key that is a constant that defines a data set in an external data source of the external data sources and a value that is a variable that belongs to the data set;
- calculating, by the hardware processor, a similarity score for each key-value pair in the list of key-value pairs that is extracted from the one or more inbound data blocks based on one or more current existing data structures;
- determining, by the hardware processor, a highest similarity score from among the similarity score that is calculated for each key-value pair in the list of key-value pairs;
- determining, by the hardware processor, that the highest similarity score for the list does not meet a predetermined similarity threshold;
- creating, by the hardware processor, a new data structure to store the list of key-value pairs for a first inbound data block from the one or more inbound data blocks; and
- storing, by the hardware processor, the list of key-value pairs in the new data structure in the structured storage system.

2. The method of claim 1, wherein each of the one or more external data sources have different data structures for their respective data sets.

3. The method of claim 1, wherein the highest similarity score is lower than the predetermined similarity threshold.

4. The method of claim 3, wherein the creating a new data structure comprises generating and executing a data command to create a database object in the structured storage system.

5. The method of claim 4, wherein the data command is a Data Definition Language (DDL) command.

6. The method of claim 1, wherein the storing comprises executing a data command to insert the list of key-value pairs into the structured storage system.

7. The method of claim 6, wherein the data command is a data manipulation language command (DML).

8. The method of claim 4, further comprises generating metadata from the one or more inbound data blocks.

9. The method of claim 8, further comprising storing the metadata in the new data structure with an associated key-value pair.

10. The method of claim 8, wherein the metadata comprises a time value associated with one of the one or more inbound data blocks, a data source associated with the one of the one or more inbound data blocks, or both.

11. The method of claim 1, further comprising consolidating the new data structure with another data structure that meet the predetermined similarity threshold.

12. A method for storing data of an unknown data context and structure in a structured storage system, the method comprising:

extracting, by a hardware processor and in real time, a list of key-value pairs from one or more inbound data blocks from one or more external data sources, wherein each key-value pair in the list of key-value pairs comprises a key that is a constant that defines a data set in an external data source of the external data sources and a value that is a variable that belongs to the data set;

calculating, by the hardware processor, a similarity score for each key-value pair in the list of key-value pairs that is extracted from the one or more inbound data blocks based on one or more current existing data structure;

determining, by the hardware processor, a highest similarity score from among the similarity score that is calculated for each key-value pair in the list of key-value pairs;

determining, by the hardware processor, that the highest similarity score for the list does meet a predetermined similarity threshold;

integrating, by the hardware processor, the list into a first current existing data structure of the one or more current existing data structures; and     storing, by the hardware processor, the list of key-value pairs in the first current existing data structure in the structured storage system.

13. The method of claim 12, wherein each of the one or more external data sources have different data structures for their respective data sets.

14. The method of claim 12, wherein the highest similarity score is greater than the predetermined similarity threshold.

15. The method of claim 12, wherein the integrating comprises generating and executing a data command to modify a database object in the structured storage system.

16. The method of claim 15, wherein the data command is a Data Definition Language (DDL) command.

17. The method of claim 12, further comprises generating metadata from the one or more inbound data blocks.

18. The method of claim 17, further comprising storing the metadata in the first current existing data structure with an associated key-value pair.

19. The method of claim 12, further comprising consolidating the first current existing data structure with another data structure that meet a predetermined similarity threshold.

20. A method for storing data of an unknown data context and structure in a structured storage system, the method comprising:

extracting, by a hardware processor and in real time, a list of key-value pairs from one or more inbound data blocks from one or more external data sources, wherein each key-value pair in the list of key-value pairs comprises a key that is a constant that defines a data set in an external data source of the external data sources and a value that is a variable that belongs to the data set;

determining, by the hardware processor, that a data structure does not exist;

creating, by the hardware processor, a new data structure to store the list of key-value pairs for a first inbound data block from the one or more inbound data blocks; and     storing, by the hardware processor, the list of key-value pairs in the new data structure in the structured storage system as a table with each key of the key-value pair denoting a different column in the table.

\* \* \* \* \*